United States Patent [19]
Matzner et al.

[11] Patent Number: 5,546,437
[45] Date of Patent: Aug. 13, 1996

[54] SPACER FOR NUCLEAR FUEL RODS

[75] Inventors: Bruce Matzner, San Jose, Calif.; Harold B. King, Wrightsville Beach; David G. Smith, Leland, both of N.C.

[73] Assignee: General Electric Company, Schenectady, N.Y.

[21] Appl. No.: 371,389

[22] Filed: Jan. 11, 1995

[51] Int. Cl.⁶ .................................................. G21C 3/34
[52] U.S. Cl. ........................ 376/442; 376/462; 376/438; 376/448
[58] Field of Search ................................. 376/442, 462, 376/438, 448; 976/DIG. 71, DIG. 81

[56] References Cited

U.S. PATENT DOCUMENTS

| | | | |
|---|---|---|---|
| 3,344,855 | 10/1967 | Clark | 165/159 |
| 3,350,276 | 10/1967 | Warberg et al. | 176/78 |
| 3,457,140 | 7/1969 | Glandin | 176/78 |
| 3,719,559 | 3/1973 | Bass | 376/442 |
| 3,749,640 | 7/1973 | Israel | 176/78 |
| 3,809,609 | 5/1974 | Krawiec et al. | 176/78 |
| 3,886,038 | 5/1975 | Raven | 176/78 |
| 3,944,779 | 3/1976 | Umino et al. | 219/121 EM |
| 4,005,521 | 2/1977 | Kaplan et al. | 29/469 |
| 4,039,379 | 8/1977 | Patterson et al. | 376/439 |
| 4,061,536 | 12/1977 | Creagan et al. | 376/439 |
| 4,069,102 | 1/1978 | Berringer et al. | 376/463 |
| 4,077,843 | 3/1978 | Patterson et al. | 376/442 |
| 4,086,809 | 5/1978 | Wu et al. | 73/161 |
| 4,089,742 | 5/1978 | Amaral et al. | 376/440 |
| 4,108,719 | 8/1978 | Olshausen | 376/245 |
| 4,119,489 | 10/1978 | Itoh et al. | 376/444 |
| 4,124,444 | 11/1978 | Jabsen | 376/444 |
| 4,125,435 | 11/1978 | Jabsen | 376/442 |
| 4,137,125 | 1/1979 | Walters | 376/442 |

(List continued on next page.)

FOREIGN PATENT DOCUMENTS

| | | |
|---|---|---|
| 0307705 | 3/1989 | European Pat. Off. . |
| 0210526 | 5/1989 | European Pat. Off. . |
| 0237064 | 3/1991 | European Pat. Off. . |
| 0428093 | 5/1991 | European Pat. Off. . |
| 0428092 | 5/1991 | European Pat. Off. . |
| 0273183 | 8/1991 | European Pat. Off. . |
| 0489334 | 6/1992 | European Pat. Off. . |
| 0503553 | 9/1992 | European Pat. Off. . |
| 0330013 | 11/1992 | European Pat. Off. . |
| 0514115 | 11/1992 | European Pat. Off. . |
| 0514116 | 11/1992 | European Pat. Off. . |
| 0514117 | 11/1992 | European Pat. Off. . |
| 0514120 | 11/1992 | European Pat. Off. . |
| 0518306 | 12/1992 | European Pat. Off. . |
| 0539867 | 5/1993 | European Pat. Off. . |
| 4118124 | 12/1992 | Germany . |
| 1-1384493 | 5/1989 | Japan . |
| 2-163695 | 6/1990 | Japan . |
| 327019 | 7/1968 | Sweden . |
| 454824 | 5/1988 | Sweden . |
| 454823 | 5/1988 | Sweden . |

*Primary Examiner*—Charles T. Jordan
*Assistant Examiner*—Meena Chelliah
*Attorney, Agent, or Firm*—Nixon & Vanderhye

[57] ABSTRACT

A spacer for retaining nuclear fuel rods in laterally spaced relation to one another includes first and second sets of spacer strips extending in mutually perpendicular diagonal directions relative to a generally rectilinear peripheral spacer band. The strips have linearly extending sections with adjacent sections angularly related to one another and meeting at apices. The sections of each strip alternately intersect a diagonal line across the spacer with the apices alternately located on opposite sides of the diagonal line. Alternate apices have springs projecting to one side of the strip for engaging fuel rods and apices between the alternate apices have stops projecting on opposite sides of the strip for engaging the fuel rods. Slots are provided in the strips enabling intermeshing of the strips with one another to define discrete cells peripherally encompassing and retaining fuel rods within the spacer. In another form, the spacer includes pairs of strips having alternating reversely curved sections with alternate springs and stops and assembled to form rows of cells. The strips are intermeshed in egg-crate fashion and welded at their junctures.

21 Claims, 6 Drawing Sheets

U.S. PATENT DOCUMENTS

| | | | |
|---|---|---|---|
| 4,142,934 | 3/1979 | Wild | 376/434 |
| 4,172,761 | 10/1979 | Raven et al. | 376/442 |
| 4,175,003 | 11/1979 | Beuchel et al. | 376/447 |
| 4,190,494 | 2/1980 | Olsson | 376/462 |
| 4,224,107 | 9/1980 | Delafosse et al. | 376/462 |
| 4,239,597 | 12/1980 | Christiansen | 376/441 |
| 4,246,783 | 1/1981 | Steven et al. | 73/161 |
| 4,268,356 | 5/1981 | Kmonk et al. | 376/462 |
| 4,312,705 | 1/1982 | Steinke | 376/441 |
| 4,313,797 | 2/1982 | Attix | 376/441 |
| 4,325,786 | 4/1982 | Wohlsen | 376/442 |
| 4,357,298 | 11/1982 | Wolters, Jr. et al. | 376/441 |
| 4,391,771 | 7/1983 | Anthony | 376/451 |
| 4,396,573 | 8/1983 | Feutrel | 376/442 |
| 4,416,852 | 11/1983 | Nylund | 376/438 |
| 4,418,036 | 11/1983 | Gjertsen et al. | 376/438 |
| 4,420,458 | 12/1983 | Dunlap et al. | 376/447 |
| 4,435,357 | 3/1984 | Krieger | 376/272 |
| 4,454,093 | 6/1984 | Nylund et al. | 376/282 |
| 4,474,730 | 10/1984 | Hellman et al. | 376/462 |
| 4,478,786 | 10/1984 | Andersson et al. | 376/444 |
| 4,489,038 | 12/1984 | Nylund | 376/446 |
| 4,491,540 | 1/1985 | Larker et al. | 252/628 |
| 4,492,844 | 1/1985 | Kobuck et al. | 219/121 |
| 4,499,047 | 2/1985 | Borrman et al. | 376/434 |
| 4,508,679 | 4/1985 | Matzner et al. | 376/438 |
| 4,512,820 | 4/1985 | Mori et al. | 148/12.7 N |
| 4,521,374 | 6/1985 | Duncan | 376/462 |
| 4,522,330 | 6/1985 | Kerrey et al. | 288/182 |
| 4,526,744 | 7/1985 | Borrman et al. | 376/440 |
| 4,526,745 | 7/1985 | Nylund et al. | 376/444 |
| 4,526,746 | 7/1985 | Fredin | 376/444 |
| 4,540,545 | 9/1985 | Kondo | 376/364 |
| 4,544,522 | 10/1985 | Curulla et al. | 376/441 |
| 4,556,531 | 12/1985 | Curulla | 376/441 |
| 4,557,892 | 12/1985 | Komoda | 376/412 |
| 4,571,324 | 2/1986 | Johansson et al. | 376/441 |
| 4,578,240 | 3/1986 | Cadwell | 376/441 |
| 4,579,711 | 4/1986 | Mishima et al. | 376/442 |
| 4,585,614 | 4/1986 | Helmersson | 376/434 |
| 4,585,616 | 4/1986 | DeMario et al. | 376/442 |
| 4,587,093 | 5/1986 | Borrman et al. | 376/444 |
| 4,587,704 | 5/1986 | Matzner et al. | 29/446 |
| 4,588,550 | 5/1986 | Blomstrand et al. | 376/436 |
| 4,597,937 | 7/1986 | Sakurai et al. | 376/441 |
| 4,617,170 | 10/1986 | Suchy | 376/438 |
| 4,632,804 | 12/1986 | Wallander et al. | 376/444 |
| 4,645,643 | 2/1987 | Leclercq | 376/447 |
| 4,646,021 | 2/1987 | Brown | 324/303 |
| 4,649,021 | 3/1987 | Taleyarkhan | 376/444 |
| 4,652,426 | 3/1987 | Boyle et al. | 376/352 |
| 4,654,193 | 3/1987 | Amano et al. | 376/436 |
| 4,655,995 | 4/1987 | Freeman et al. | 376/267 |
| 4,656,000 | 4/1987 | Sakurai et al | 376/352 |
| 4,659,541 | 4/1987 | Rylatt | 376/442 |
| 4,659,542 | 4/1987 | Kerrey | 376/442 |
| 4,659,543 | 4/1987 | Lui | 376/444 |
| 4,661,220 | 4/1987 | Fejes et al. | 204/141.5 |
| 4,664,882 | 5/1987 | Doshi | 376/423 |
| 4,665,866 | 5/1987 | Wepfer | 122/510 |
| 4,666,657 | 5/1987 | Altman | 376/234 |
| 4,666,663 | 5/1987 | Steinke | 376/441 |
| 4,666,664 | 5/1987 | Doshi | 376/261 |
| 4,671,926 | 6/1987 | Broberg et al. | 376/364 |
| 4,675,154 | 6/1987 | Nelson et al. | 376/444 |
| 4,683,115 | 7/1987 | Frömel | 376/439 |
| 4,686,079 | 8/1987 | Ishikawa et al. | 376/444 |
| 4,689,091 | 8/1987 | Yoshida et al. | 148/11.5 F |
| 4,692,302 | 9/1987 | DeMario et al. | 376/439 |
| 4,692,303 | 9/1987 | Osborne | 376/446 |
| 4,695,426 | 9/1987 | Nylund | 376/441 |
| 4,698,204 | 10/1987 | Taleyarkhan | 376/439 |
| 4,702,881 | 10/1987 | Weiland et al. | 376/442 |
| 4,705,663 | 11/1987 | Steven et al. | 376/442 |
| 4,707,328 | 11/1987 | Arbink et al. | 376/446 |
| 4,708,845 | 11/1987 | Mildrum et al. | 376/435 |
| 4,711,436 | 12/1987 | Kobuck et al. | 269/40 |
| 4,714,585 | 12/1987 | Kast | 376/442 |
| 4,716,011 | 12/1987 | Taleyarkhan | 376/281 |
| 4,716,016 | 12/1987 | DeMario et al. | 376/446 |
| 4,725,403 | 2/1988 | Buettiker | 376/439 |
| 4,726,926 | 2/1988 | Patterson et al. | 376/439 |
| 4,728,490 | 3/1988 | Taleyarkhan | 376/439 |
| 4,729,867 | 3/1988 | DeMario | 376/261 |
| 4,735,766 | 4/1988 | Scharpenberg | 376/245 |
| 4,735,769 | 4/1988 | Lettau | 376/441 |
| 4,738,819 | 4/1988 | Taleyarkhan | 376/444 |
| 4,738,821 | 4/1988 | Shallenberger et al. | 376/446 |
| 4,740,350 | 4/1988 | Taleyarkhan | 376/441 |
| 4,740,351 | 4/1988 | Katsumizu et al. | 376/446 |
| 4,744,942 | 5/1988 | Ferrari et al. | 376/442 |
| 4,749,547 | 6/1988 | Blomstrand et al. | 376/444 |
| 4,753,774 | 6/1988 | Taleyarkhan et al. | 376/444 |
| 4,756,878 | 7/1988 | King et al. | 376/439 |
| 4,758,403 | 7/1988 | Noailly | 376/439 |
| 4,759,912 | 7/1988 | Taleyarkhan | 376/435 |
| 4,770,843 | 9/1988 | Taleyarkhan | 376/216 |
| 4,775,509 | 10/1988 | Noailly et al. | 376/442 |
| 4,780,273 | 10/1988 | Dressel | 376/441 |
| 4,784,825 | 11/1988 | Busselman et al. | 376/399 |
| 4,793,963 | 12/1988 | DeMario et al. | 376/267 |
| 4,795,608 | 1/1989 | Nylund | 376/444 |
| 4,803,043 | 2/1989 | DeMario et al. | 376/442 |
| 4,804,516 | 2/1989 | Thomazet et al. | 376/439 |
| 4,818,471 | 4/1989 | Thomson et al. | 376/258 |
| 4,818,473 | 4/1989 | Lui | 376/261 |
| 4,818,478 | 4/1989 | Taleyarkhan | 376/435 |
| 4,828,782 | 5/1989 | Donnelly | 376/252 |
| 4,839,136 | 6/1989 | DeMario et al. | 376/462 |
| 4,844,860 | 7/1989 | Hatfield | 376/462 |
| 4,849,161 | 7/1989 | Brown et al. | 376/439 |
| 4,859,407 | 8/1989 | Nylund | 376/446 |
| 4,869,865 | 9/1989 | White et al. | 376/260 |
| 4,879,090 | 11/1989 | Perrotti et al. | 376/462 |
| 4,885,127 | 12/1989 | Yokoyama | 376/462 |
| 4,895,698 | 1/1990 | DeMario | 376/442 |
| 4,913,707 | 4/1990 | Moreno et al. | 29/792 |
| 4,913,875 | 4/1990 | Johansson et al. | 376/439 |
| 4,924,586 | 5/1990 | King, Jr. et al. | 29/723 |
| 4,931,615 | 6/1990 | Muncy et al. | 219/121.67 |
| 4,946,587 | 8/1990 | Reeves et al. | 209/539 |
| 4,957,697 | 9/1990 | Wada | 376/442 |
| 4,970,048 | 11/1990 | Noailly | 376/439 |
| 4,980,121 | 12/1990 | Roberts et al. | 376/439 |
| 4,988,474 | 1/1991 | Hoffmann et al. | 376/261 |
| 4,994,234 | 2/1991 | Nylund | 376/443 |
| 4,999,153 | 3/1991 | Johansson et al. | 376/443 |
| 5,002,726 | 3/1991 | Johansson | 376/448 |
| 5,024,807 | 6/1991 | Hatfield et al. | 376/352 |
| 5,024,810 | 6/1991 | Bachman | 376/438 |
| 5,032,351 | 7/1991 | Johansson | 376/438 |
| 5,035,853 | 7/1991 | Lettau et al. | 376/441 |
| 5,069,864 | 12/1991 | Johansson | 376/441 |
| 5,078,961 | 1/1992 | Johansson et al. | 376/448 |
| 5,080,858 | 1/1992 | Nylund | 376/443 |
| 5,085,827 | 2/1992 | Johansson et al. | 376/444 |
| 5,089,220 | 2/1992 | Nylund | 376/439 |
| 5,089,221 | 2/1992 | Johansson et al. | 376/442 |
| 5,091,145 | 2/1992 | Petit | 376/441 |
| 5,094,805 | 3/1992 | Suchy et al. | 376/438 |
| 5,096,660 | 3/1992 | Hembjer et al. | 376/438 |
| 5,110,539 | 5/1992 | Perrotti et al. | 376/439 |

| | | | |
|---|---|---|---|
| 5,128,097 | 7/1992 | Fukasawa et al. | 376/438 |
| 5,130,083 | 7/1992 | Johansson | 376/441 |
| 5,139,736 | 8/1992 | Bryan | 376/442 |
| 5,147,600 | 9/1992 | Kadono et al. | 376/462 |
| 5,149,495 | 9/1992 | Elkins | 376/444 |
| 5,173,252 | 12/1992 | Johansson | 376/448 |
| 5,174,949 | 12/1992 | Johansson | 376/439 |
| 5,178,825 | 1/1993 | Johansson | 376/438 |
| 5,180,548 | 1/1993 | Verdier | 376/439 |
| 5,180,550 | 1/1993 | Nylund | 376/439 |
| 5,183,629 | 2/1993 | Canat et al. | 376/439 |
| 5,186,891 | 2/1993 | Johansson et al. | 376/438 |
| 5,200,143 | 4/1993 | Johansson | 376/449 |
| 5,209,899 | 5/1993 | Johansson et al. | 376/442 |
| 5,211,908 | 5/1993 | Verdier | 376/442 |
| 5,226,633 | 7/1993 | Willard, Jr. | 267/159 |
| 5,229,068 | 7/1993 | Johansson et al. | 376/371 |
| 5,243,634 | 9/1993 | Bryan | 376/439 |
| 5,245,644 | 9/1993 | Büttner et al. | 376/442 |
| 5,253,278 | 10/1993 | Kanazawa et al. | 376/434 |
| 5,263,071 | 11/1993 | Farkas et al. | 376/438 |
| 5,272,743 | 12/1993 | Yamazaki et al. | 376/463 |
| 5,307,393 | 4/1994 | Hatfield | 376/442 |
| 5,313,506 | 5/1994 | Matzner et al. | 376/441 |
| 5,317,613 | 5/1994 | Fennern | 376/439 |
| 5,327,470 | 7/1994 | Johansson | 376/438 |
| 5,343,504 | 8/1994 | Gaylord, Jr. et al. | 376/247 |
| 5,345,487 | 9/1994 | Johansson | 376/441 |
| 5,361,288 | 11/1994 | Johansson | 376/441 |
| 5,371,768 | 12/1994 | Matzner | 376/441 |
| 5,375,154 | 12/1994 | Matzner et al. | 228/10 |
| 5,375,756 | 12/1994 | Haughton et al. | 228/10 |
| 5,377,236 | 12/1994 | Smith et al. | 376/245 |

SPACER FOR NUCLEAR FUEL RODS

TECHNICAL FIELD

The present invention relates to spacers for maintaining nuclear fuel rods of a nuclear fuel bundle in substantially fixed lateral relation relative to one another and particularly relates to a spacer comprised of a plurality of strips readily manufactured and assembled one with the other to form the spacer.

BACKGROUND

In nuclear power reactors, the nuclear fuel typically comprises elongated rods containing nuclear fuel pellets such as uranium oxide and/or plutonium oxide within a sealed cladding. A number of the fuel rods are grouped together to form a fuel bundle. Each fuel bundle is typically open-ended at its top and bottom to form a flow channel. Thus, coolant flows upwardly through a lower tie plate, through the spaces between the fuel rods and outwardly through an upper tie plate, the water being heated during its flow to produce steam, for example, for driving turbines.

The spaced fuel rods supported between the upper and lower tie plates are maintained in a predetermined array and are maintained in spaced lateral relationship relative to one another by a plurality of spacers. The spacers are vertically spaced one from the other along the length of the vertically extending fuel bundle. Because the fuel rods are long and slender, i.e., have a very small diameter on the order of less than ½-inch, and are laterally spaced one from the other in the fuel bundle only a small fraction of an inch away from one another, it is essential to restrain the rods from lateral bowing or vibrating during operation. Fuel rod spacers are provided for this purpose and are well known in the art.

Conventional spacers are designed essentially to satisfy certain thermal hydraulic performance criteria, typically without regard for simplicity and ease of manufacture. This has oftentimes resulted in excessive manufacturing costs. For example, current boiling water reactor unit cell spacers are manufactured from individual cells, each associated with one fuel rod position within the bundle. This requires at least one part for each fueled, latticed position. Consequently, a substantial number of parts are required for the fabrication of each spacer, with resultant increase in manufacturing costs and handling. It is therefore desirable to reduce the cost of spacers, and facilitate their manufacturing process, while simultaneously maintaining the structural, nuclear and thermal hydraulic performance capabilities of the prior spacers within the fuel bundle.

DISCLOSURE OF THE INVENTION

According to one embodiment of the present invention, a spacer is formed using specifically configured strips extending generally diagonally within the spacer and which strips are intermeshed with one another in egg crate fashion. Particularly, the strips include first and second sets of strips mutually perpendicular to one another and extending generally along spaced diagonal lines within the spacer which is generally rectilinear in outline. Each strip includes a plurality of generally linearly extending sections, with adjacent sections being angularly related relative to one another. In locating the strips in the spacer, the sections of each strip alternately intersect a diagonal line through the spacer. Thus, angularly related adjacent sections define apices with one another and which apices alternately lie on opposite sides of the diagonal line. Alternate apices of each strip carry a spring which projects to one side of the strip for engagement with a fuel rod. The apices between the alternate spring carrying apices carry one or more stops which project from the opposite side of the strip and against which the fuel rods bear under the bias of the springs. The strips are formed integrally of linearly extending bands along opposite longitudinal edges thereof, interconnected at spaced longitudinal positions by intermediate bands. The intermediate band at alternate apices is deformed to project to one side of the strip and thus forms the projecting spring. An intermediate band in each section between the end apices defining that section has a slot extending approximately one-half the width of the strip and opening through one edge of the strip.

To assemble the spacer, the first and second sets of strips are intermeshed by engaging the slots of each strip with the balance of the intermediate bands of the other diagonally extending strip. In this manner, the springs on one side of each strip are located to bear against diagonally adjacent fuel rods. The steps on the alternate apices of each strip are also located to be engaged by diagonally adjacent fuel rods. Thus, each strip contacts only one fuel rod at each apex and adjacent pairs of strips of the first and second sets thereof surround each fuel rod. Stated differently, and upon assembly of the rods and spacers to form a bundle, each fuel rod is biased by the springs formed by a strip of each of the first and second sets engaging along one side of the fuel rod into butting engagement with the stops formed by a strip of each of first and second sets of strips located along the opposite side of the fuel rod. It will be appreciated that with this arrangement, the strips intersect one another along lines of intersection parallel to the fuel rods, thus facilitating the thermal hydraulic performance of the fuel rod assembly.

Further, only a small number of parts are required to form the foregoing described present spacer as compared with the number of parts necessary to form previous spacers. For example, in a 10×10 array of fuel rods with two openings for water rods within the fuel bundle, a maximum number of 44 strips, with 22 strips extending in each of the diagonal directions are required. The ends of the strips are, of course, secured to the peripheral band about the spacer, for example, by welding.

In accordance with another embodiment of the present invention, the spacer is formed from pairs of punched, coined and preformed strips fabricated from flat sheet stock. The strips of each pair intermesh with one another in interlocking slots in egg-crate fashion to form a row of cells for holding nuclear fuel rods. The lengths of the intermeshed strips is predetermined to form a row of cells which can comprise any desired number of cells, for example, three, five or ten cells long, it being appreciated that multiple rows of paired strips can be formed, arranged side-by-side in a spacer configuration and welded together to form the spacer. To accomplish this, each strip is punched from flat sheet metal stock to provide alternating reversely curved or arcuate sections with next-adjacent arcuate sections having springs and stops, respectively. For example, each strip is integral and is formed of bands along opposite edges interconnected by a pair of springs bent to project inwardly on the concave side of alternate arcuate sections. Every other arcuate section is provided with a pair of stops along each of the opposite bands similarly projecting inwardly thereof. Each pair of strips has slots at the junctures between their reversely curved sections. The slots open through the opposite edges of the respective strips so that the two strips can be laterally juxtaposed and intermeshed with one another in egg-crate fashion whereby arcuate sections of the strips lie laterally opposite one another and form generally circular openings for receiving the fuel rods. Instead of individual cell parts separately handled and welded together, the pair of strips can be welded at their junctures and this greatly reduces the number of parts and the speed of assembly. With each pair of strips defining a row of cells for receiving rods, adjacent rows are provided in the spacer by welding the rows together.

In a preferred embodiment according to the present invention, there is provided a spacer for retaining nuclear fuel rods in laterally spaced relation relative to one another comprising a generally rectilinear peripherally extending spacer band, first and second sets of spacer strips extending in first and second generally mutually perpendicular diagonal directions, respectively, relative to the spacer band, the strips of the first and second sets thereof each having linearly extending sections with adjacent sections angularly related to one another and meeting at apices, the sections of each strip alternately intersecting a diagonal line across the spacer with the apices alternately located on opposite sides of the diagonal line, alternate apices of each strip having springs projecting to one side thereof for engaging fuel rods and apices of each strip between the alternate apices having stops projecting to an opposite side of the strip for engaging fuel rods, the sections of the first and second sets of strips having slots intermediate adjacent apices thereof and opening through opposite edges thereof, respectively, first and second sets of strips being intermeshed with one another with the slots of the first set of strips receiving portions of the sections of the second set of strips and the slots of the second set of strips receiving portions of the sections of the first set of strips.

In a further preferred embodiment according to the present invention, there is provided a spacer for retaining nuclear fuel rods in laterally spaced relation relative to one another comprising a generally rectilinear peripherally extending spacer band, first and second sets of spacer strips extending in first and second generally mutually perpendicular diagonal directions, respectively, relative to the spacer band, the strips of the first and second sets thereof each having linearly extending sections with adjacent sections angularly related to one another and meeting at apices, springs projecting to one side of each strip for engaging fuel rods and stops projecting to an opposite side of each strip for engaging fuel rods, the sections of the first and second sets of strips having slots opening through opposite edges thereof, respectively, first and second sets of strips being intermeshed with one another with the slots of the first set of strips receiving portions of the sections of the second set of strips and the slots of the second set of strips receiving portions of the sections of the first set of strips thereby defining a rectilinear array of discrete cells for receiving fuel rods with each cell bounded by a pair of strips of the first set thereof and a pair of strips of the second set thereof, strips defining adjacent cells in the rectilinear array thereof intersecting one another between the adjacent cells forming substantially a line contact with one another.

In a still further preferred embodiment according to the present invention, there is provided a spacer for retaining nuclear fuel rods in laterally spaced relation relative to one another, comprising a generally rectilinear peripherally extending spacer band, a plurality of spacer strips within the spacer band for forming a plurality of openings for receiving fuel rods and spacing the fuel rods from one another, first and second spacer strips of the plurality thereof each including alternate reversely curved sections with next-adjacent sections having a spring and a stop projecting in opposite directions, respectively, from the strip, each of the first and second strips having slots at junctures between the reversely curved sections and opening through opposite edges thereof, the first and second strips being laterally juxtaposed and intermeshed with one another, with the slots of the first strip receiving portions of the second strip and the slots of the second strip receiving portions of the first strip such that the arcuate sections of the first and second strips lie laterally opposite one another and form generally circular openings with the springs of each of the first and second strips lying opposite stops of each other of the first and second strips across the openings.

Accordingly, it is a primary object of the present invention to provide a novel and improved spacer for a nuclear fuel bundle which utilizes a minimum number of strips disposed in egg crate fashion relative to one another to form a spacer and which minimizes spacer fabrication and parts handling problems associated with prior spacer fabrication techniques, thereby reducing costs.

BEST MODE FOR CARRYING OUT THE INVENTION

Figure 1:
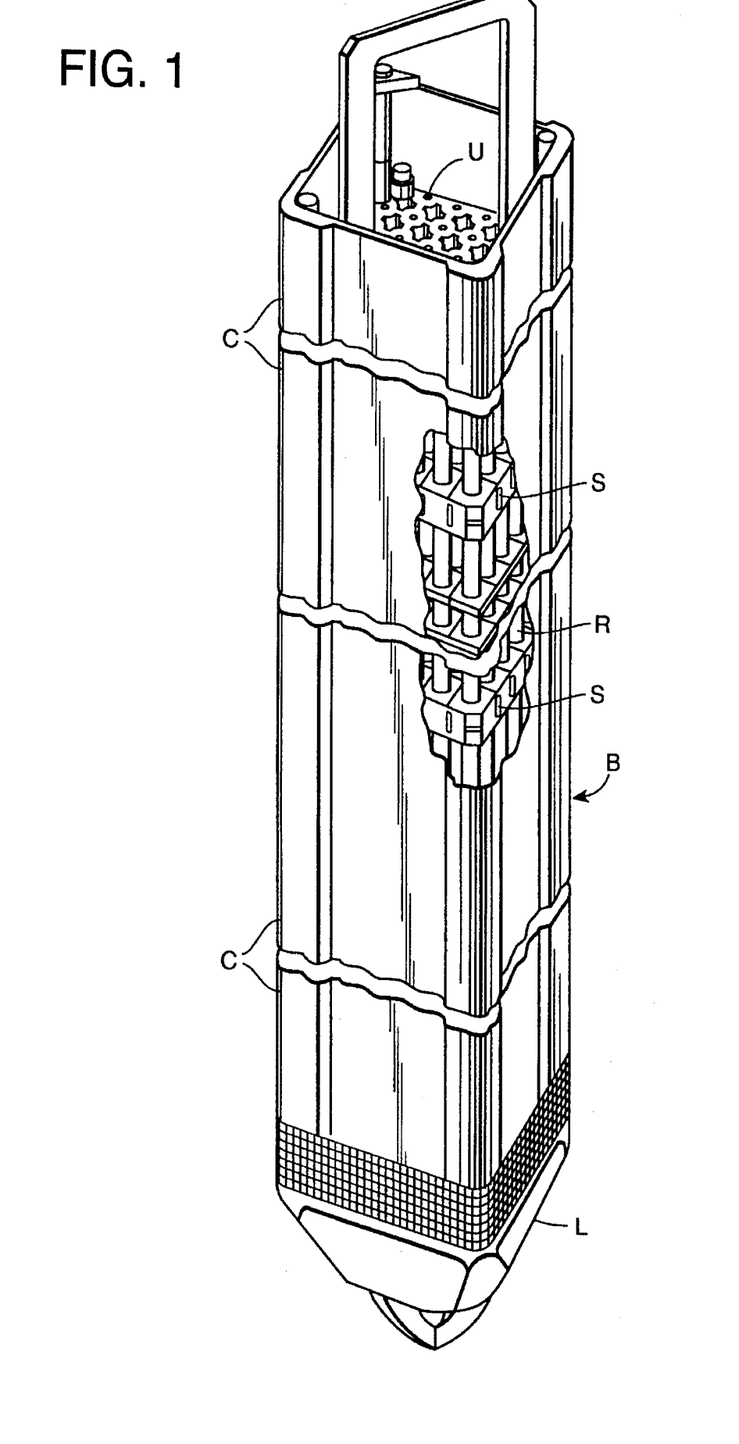
FIG. 1 is a perspective view of a fuel rod assembly for a nuclear reactor according to the present invention.

Referring now to FIG. 1, a fuel bundle B for a boiling water nuclear reactor is illustrated. The fuel bundle includes a lower tie plate L and an upper tie plate U confining a square section matrix of fuel rods R. Lower tie plate L serves to support and permit the inflow of liquid coolant. Upper tie plate U holds the matrix of fuel rods R in a vertical upstanding position. Between the lower tie plate L and the upper tie plate U is a square channel C which surrounds the fuel bundle. The channel C confines the fluid flow from the lower tie plate to the upper tie plate within the interior of the fuel bundle. As apparent from FIG. 1, the fuel bundle is elongated in a vertical direction, for example, on the order of 160 inches. Because of the length of the fuel bundle and the slender nature of the fuel rods, it is important that the fuel rods be maintained in accurate laterally spaced positions relative to one another. To accomplish that, a plurality of spacers S are disposed in the fuel bundle at vertically spaced positions relative to one another. The spacers define discrete cells for confining respective fuel rods R. The spacers are surrounded by a spacer band and generally the spacer is rectilinear, e.g., a square configuration, as viewed in plan. While a 10×10 array of fuel rods is specifically illustrated in FIG. 2, it will be appreciated that a lesser or greater number of fuel rods may be employed, for example, in 8×8 or 9×9 arrays or more. Additionally, those of skill in the art will recognize that there are large central water rods which likewise extend through the spacers. While the water rods are not illustrated, one or two water rods of larger diameter than the diameter of the fuel rods typically extend through central portions of each fuel bundle and, hence, through the central portions of each spacer.

Figure 2:
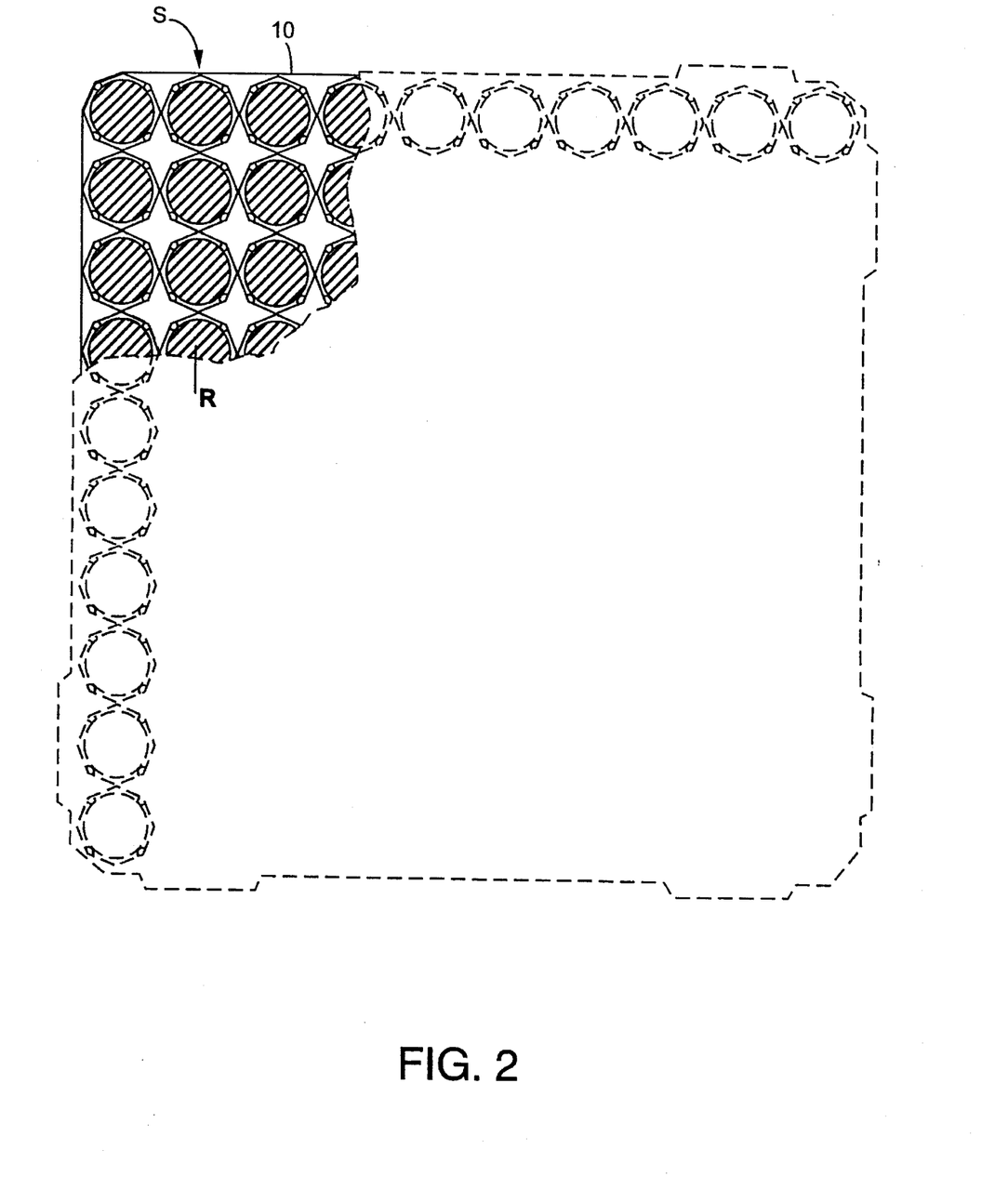
FIG. 2 is a fragmentary enlarged plan view of a spacer illustrating a portion of the fuel rods and strips forming the spacer.
Figure 3:
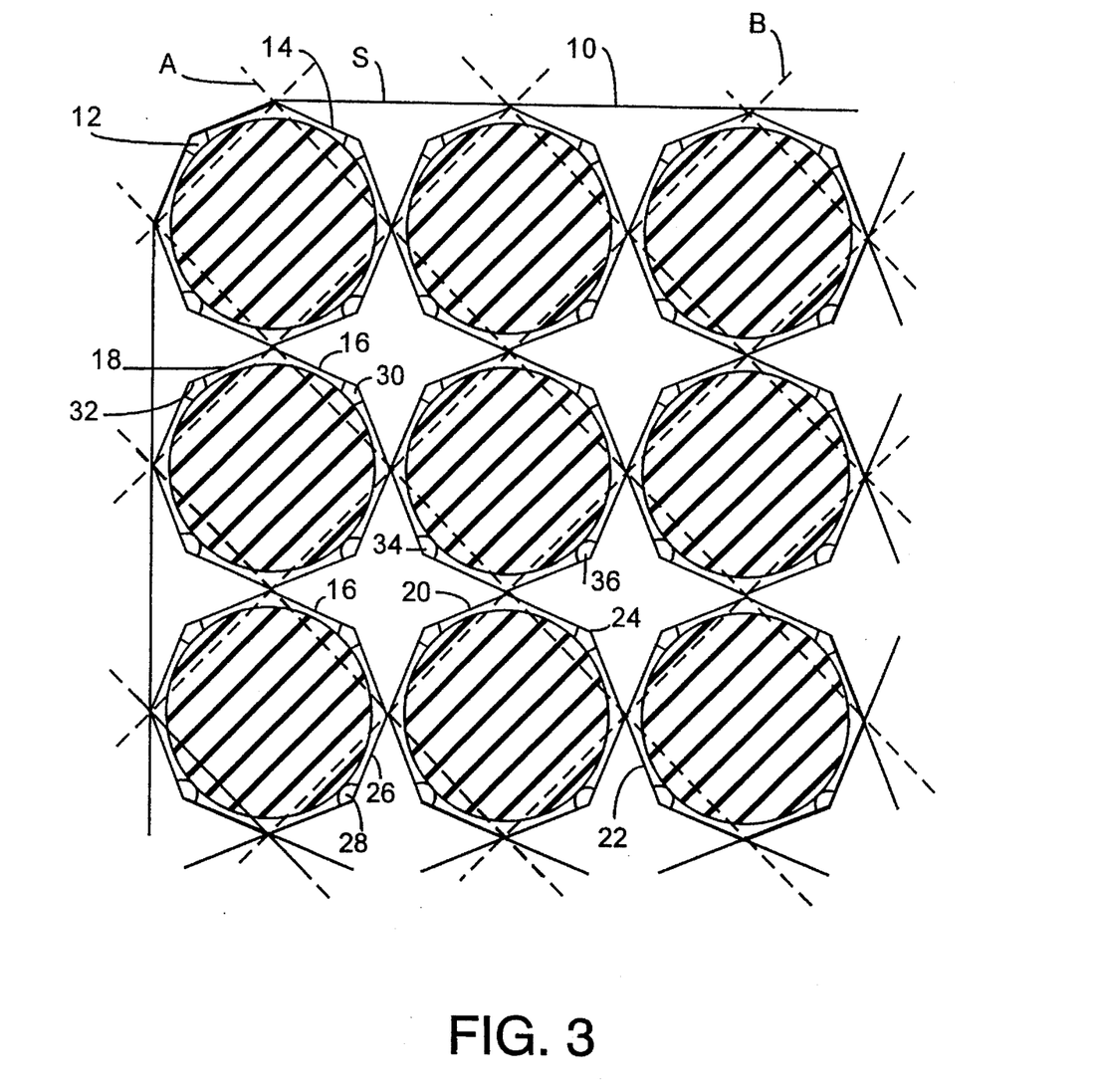
FIG. 3 is an enlarged view of a corner portion of the spacer illustrated in FIG. 2.

Turning now to FIGS. 2 and 3, the illustrated spacer S is comprised of a peripheral band 10 which surrounds first and second sets of strips which form the matrix of openings for receiving the fuel rods R. The peripheral band 10 is comprised of continuous linearly extending upper and lower strips spaced from one another and interconnected by generally vertically extending strips at laterally spaced locations therealong for structural purposes. The bands 10 have a vertically extending strip at each of the corners of the spacer which projects inwardly to form a spring 12 for engaging a corner fuel rod. The peripheral band 10 comprises a structural support for the first and second sets of strips which define the matrix within the spacer. A first set of strips 14 extends in a first diagonal direction relative to the rectilinear or square spacer frame 10, the first diagonal direction being indicated by the dashed lines A. Thus, a plurality of strips 16 of the first set thereof lie generally along diagonals A of spacer S. A second set 18 of strips 20 extend along opposite diagonals, indicated by the dashed lines B. The strips of each set therefore extend generally diagonally between the right angularly related adjacent sides of the spacer S and are connected, preferably by welding, at their opposite ends to the sides of the spacer. Where water rods intervene in the central portions of the spacer, the ends of the strips of both diagonal directions are secured to framing members, not shown, outlining the locations of the water rods. Generally, however, the strips extend continuously between the right angularly related adjacent sides of the spacer.

As best illustrated in FIG. 3, it will be seen that each of the strips 16 and 20 extend in mutually perpendicular directions relative to one another and in diagonal directions A and B, respectively, relative to the rectilinear spacer band 10. Each strip 16 and 20 is also formed of a plurality of linearly extending sections angularly related to one another, meeting at apices. For example, strips 16 have linear extending sections 22 with adjacent sections 22 angularly related to one another and meeting at apices 24. Similarly, strips 20 of the second set of strips 18 have linearly extending sections 26 angularly related to one another and meeting at apices 28. From a review of FIG. 3, it will therefore be appreciated that the sections 22 of strips 16 alternately intersect the diagonal lines A across the spacer, with the apices 24 located alternately on opposite sides of the diagonal lines A. Similarly, the sections 26 of strips 20 alternately intersect the diagonal lines B across the spacer with the apices 28 located alternately on opposite sides of the diagonal line B. To this extent, therefore, the strips are symmetrical on opposite sides of the diagonal lines.

Figure 4:
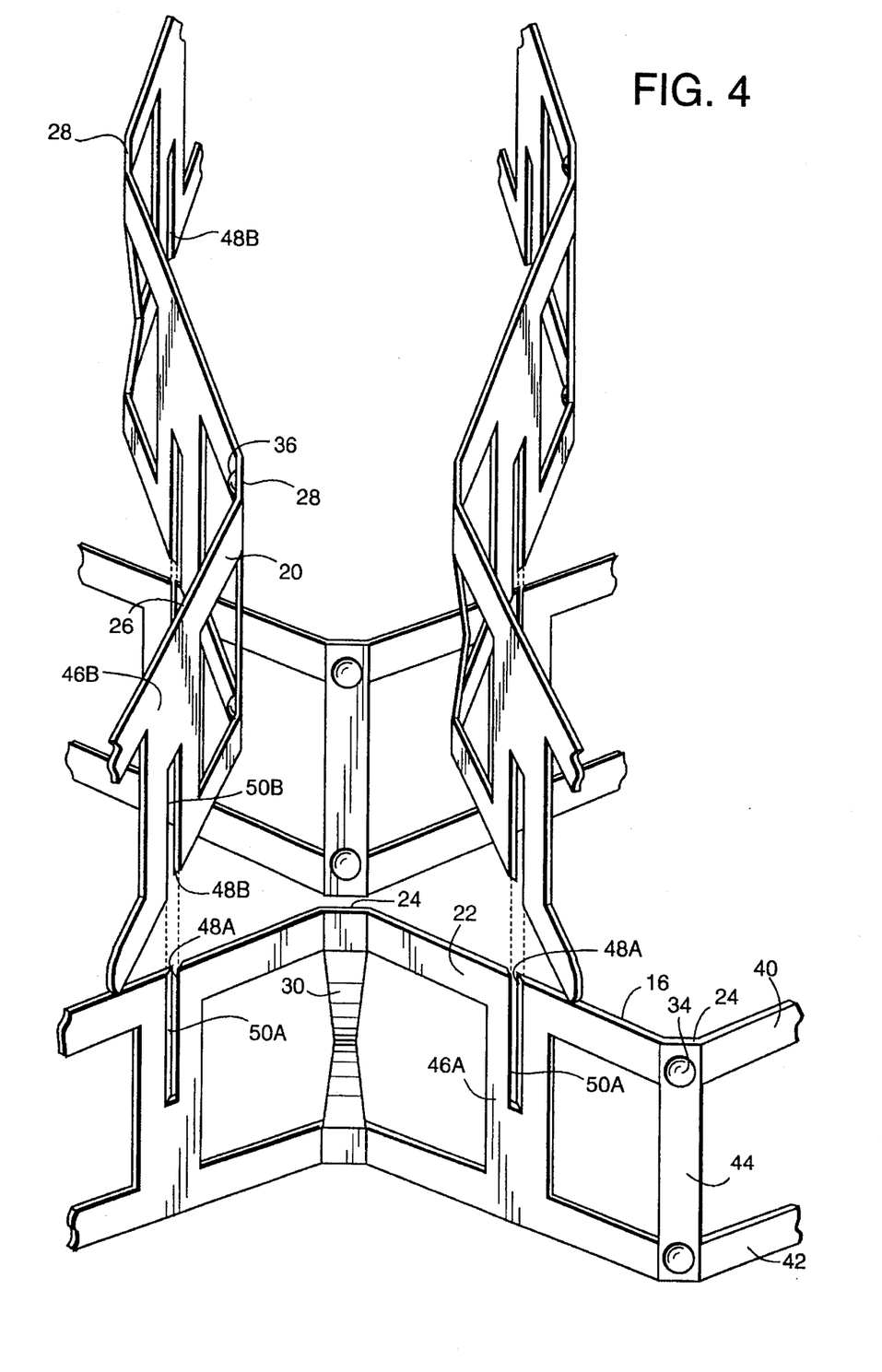
FIG. 4 is a perspective view of a pair of spacer strips illustrating details of each strip and their intermeshing relationship.

From a review of FIGS. 3 and 4, each of alternate apices 24 and 28 of strips 16 and 20, respectively, have respective springs 30 and 32 projecting to one side of the strips for engaging the fuel rods. As illustrated in FIG. 3, the generally pentagonal designations on the strips denote the springs 30 and 32, while the generally semi-circular designations on the strips denote stops 34 and 36 on strips 16 and 20, respectively. More particularly, the apices 23 in each strip 16 between the alternate apices containing the springs 30 have stops 34 projecting to the opposite side of strip 16 than springs 30. The apices 32 in each strip 20 between the alternate apices containing the springs 32 have stops 36 projecting to the opposite side of the strip than springs 32.

From a review of FIG. 3, it will be appreciated that the springs and stops both engage fuel rods R. Particularly, the springs 30 of each strip 16 extending generally parallel to diagonal line A engage diagonally adjacent fuel rods. The springs 32 of each strip 20 extending generally parallel to diagonal lines B engage diagonally adjacent fuel rods. Similarly, the stops 34 of strips 16 along diagonal lines A are engaged by diagonally adjacent fuel rods, while the stops 36 of strips 20 along diagonal lines B are similarly engaged by fuel rods diagonally adjacent one another. Thus, each fuel rod R is surrounded on opposite sides by two of strips 16 with a spring 30 of one strip 16 biasing the fuel rod R against the stop 34 of the other strip 16 and by two of strips 20 with a spring 32 of one strip 20 biasing the fuel rod R against the stop 36 of the other strip 20.

Referring to FIG. 4, the strips 16 and 20 are each formed of generally continuous longitudinally extending edge or band portions 40 and 42 interconnected at longitudinally spaced positions by transversely extending intermediate strips or bands 44 at each of the apices. Intermediate strips 46 engage the longitudinally extending edges 40 and 42 at a location intermediate the apices at the ends of each section. As illustrated, the bands 40, 42 and 44 define voids in the strips 16 and 20. For clarity of the subsequent description, similar parts in strips 16 and 20 are designated in the drawing Figures with like reference numerals followed by the suffix "A" or "B" depending upon in which strip 16 or 20 the part is located.

Figure 5:
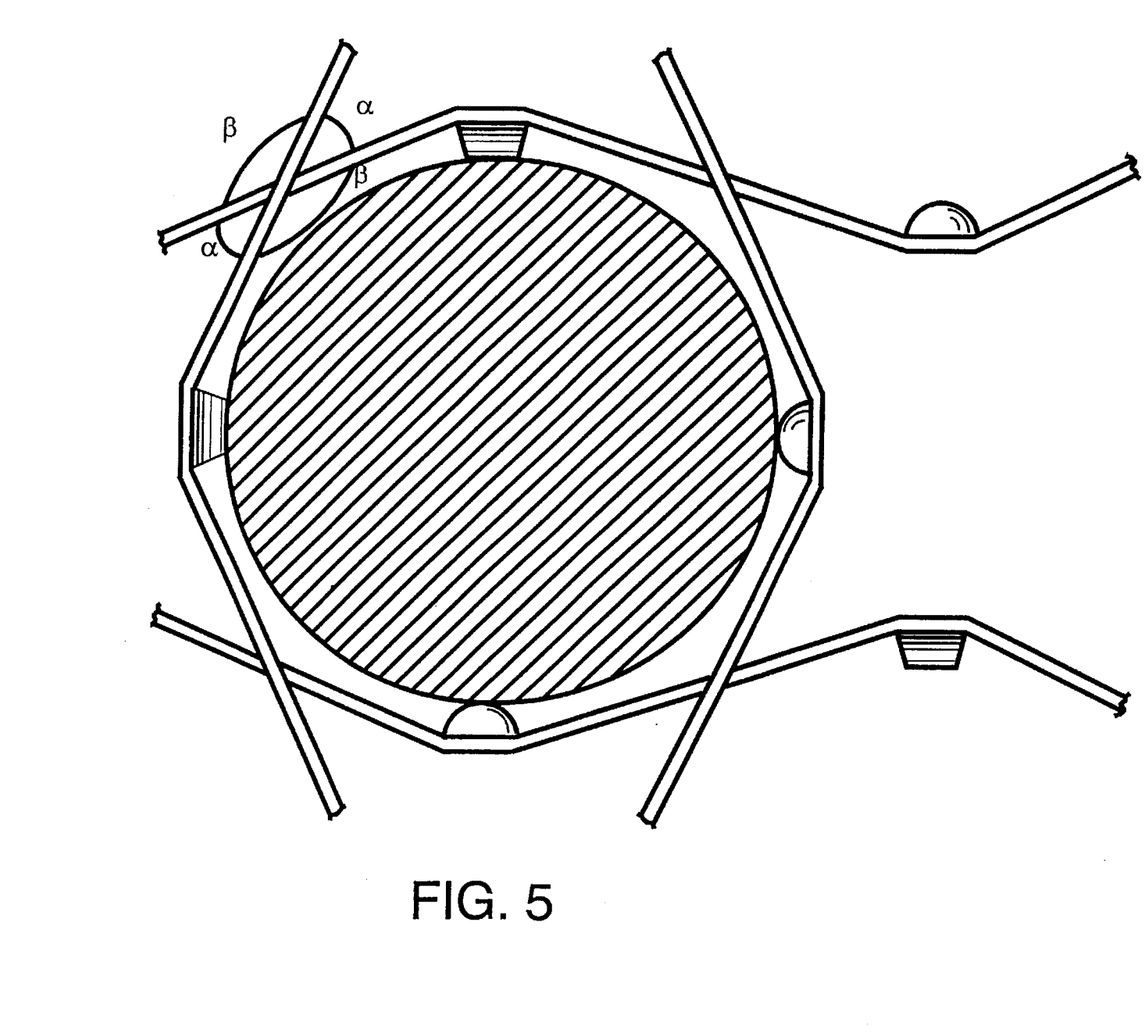
FIG. 5 is an enlarged view of strips surrounding a fuel rod.

Each strip 16 extending in one diagonal direction, e.g., diagonal direction A, has a slot 48A opening along a common edge of the strip substantially medially between the apices 24 between adjacent sections. The slots 48A extend substantially one-half the width of each strip 16 and have walls 50A which are angled relative to the plane containing each section 22, for purposes to be described. The angle, however, is different than an angle normal to the plane containing the section. The strips extending along the opposite diagonal, e.g., diagonal B, have similar slots 48B with angled edges 50B, however, opening through the opposite longitudinal edge of the strip. In this manner, the strips can be intermeshed one with the other, with each slot 48A of strip 16 receiving the balance of the intermediate band 46B extending from the base of the intermeshing slot 48B. Conversely, each slot 48B of strip 20 receives the balance of the intermediate band 46A extending from the base of the intermeshing slot 48A. Thus, the angles of the wall surfaces 50A and 50B of each slot facilitate intermeshing engagement of strips 16 and 20. It will also be appreciated that the strips, when intermeshed, do not extend perpendicular to one another. Rather, the strips extend at angles relative to one another forming pairs of acute and obtuse angles α and β, respectively, (FIG. 5) on opposite sides of the line of intersection of the oppositely diagonally extending strips.

Referring to FIG. 4, it will be seen that the springs 30 and 32 at the alternating apices of each of the strips constitute leaf springs projecting laterally outwardly from the plane of the strip at the apex. Thus, the medial portion of the spring forms essentially a point contact with the fuel rod upon insertion of the rod into the matrix. Also, the stops formed at the alternate apices project to a side of each strip opposite the side from which the spring projects. The stops comprise dimples or struck portions of the apices of the strips along the opposite longitudinal edges 40 and 42 to form essentially concave projections on one side and convex depressions on the opposite side.

In assembly, as illustrated in FIG. 3, the strips are intermeshed by the engagement of the strips and slots with one another as previously described. Thus, the springs 30 and 32 of a pair of diagonally intersecting strips engage a single fuel rod on one side of the fuel rod, while the stops of another pair of diagonally intersecting strips engage the opposite side of the fuel rod. The points of contact with each fuel rod by the springs and stops are at substantially 90° locations relative to one another. Thus, four strips completely encompass each fuel rod within the matrix (except at the spacer corners) and form a discrete cell for receiving and fully encompassing or surrounding a fuel rod. Importantly, the intersection of the strips extending in opposite diagonal directions forms essentially a line contact in the direction of the flow of water through the nuclear fuel bundle. That is, the cells defined by the two pairs of strips 16 and 20 contact adjacent cells in the rectilinear array thereof along a line rather than a flat side to flat side contact between adjacent cells as in the prior art. This line contact forms only a minor obstruction to the flow of cooling water and hence the flow area between adjacent fuel rods is enlarged in comparison with the flow areas between the rods of prior art spacers.

The spacer of the present invention is preferably formed of like materials throughout. For example, the spacer strips may be formed of Inconel or Zircaloy. A combination of Zircaloy forming the spacer and Inconel forming the springs may also be used. It will also be appreciated that the foregoing-described spacer design requires less than one-half the number of discrete parts required to construct prior art unit cell type spacers without compromising thermal hydraulic, nuclear or mechanical performance. With this construction, manufacturing costs and complexity are significantly reduced.

Figure 6:
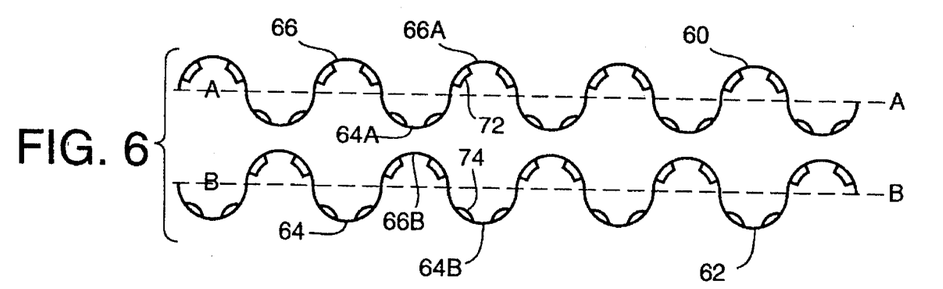
FIG. 6 is an edge view of a pair of strips for forming a row of cells of a spacer constructed in accordance with another embodiment of the present invention.

Referring now to the second embodiment of the present invention illustrated in FIGS. 6–10, first and second strips 60 and 62, respectively, are illustrated each in a formed condition ready for assembly with one another for forming a row of cells forming part of a is spacer. As illustrated, each of the strips 60 and 62 have alternating, reversely curved sections. That is, the first strip 60 has adjacent reversely curved arcuate sections 64A and 66A, while strip 62 has next-adjacent, reversely curved sections 64B and 66B. Each arcuate section extends substantially 180° having a center in a longitudinal plane A—A or B—B passing longitudinally of the strips 60 and 62, respectively. Each of the reversely curved sections 64A and 66A meet one another at junctures along the plane A—A where the curvature reverses. Similarly, each of the reversely curved sections 64B and 66B meet one another at junctures along the plane B—B. The strips 60 and 62 illustrated in FIG. 6 are shown in a position before they are laterally juxtaposed and intermeshed, as described below, to form a single row of substantially circular cells. For example, in FIG. 7, the strips have been assembled and the arcuate sections 64B and 66A of strips 60 and 62, respectively, lie opposite one another to form alternate circular openings, while the sections 64A and 66B lie opposite one another to form alternate circular openings.

Figure 8:
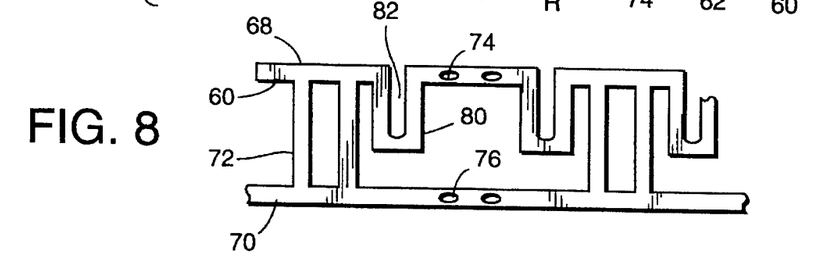
FIGS. 8 and 9 are respective side elevational views of the first and second strips illustrated in FIG. 6 in a flat condition.
Figure 9:
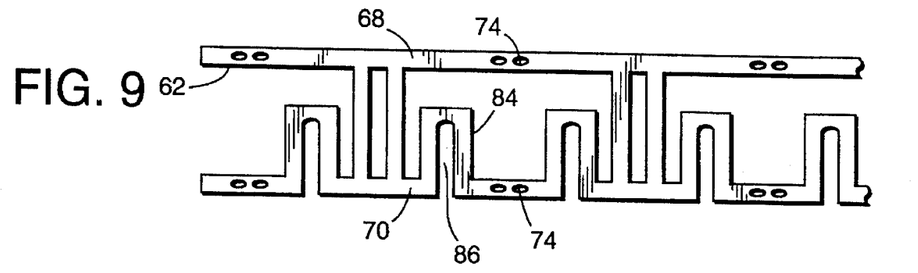
Figure 10:
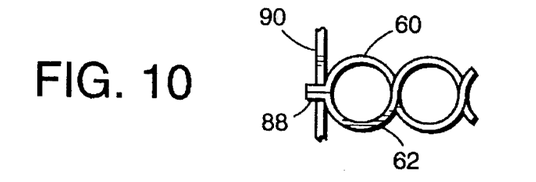
FIG. 10 is a fragmentary plan view of a pair of assembled strips illustrating the connection between the cell strips and the edge of the spacer.

Referring now to FIGS. 8 and 9, the strips 60 and 62 are illustrated in a flattened configuration prior to being formed as in FIG. 6. It will be appreciated that each of the strips includes a pair of opposite edges 68 and 70 interconnected, preferably by a pair of springs 72, at locations which, in the final spring assembly, are located at alternate arcuate sections 66. Each of the edges 68 and 70 also includes a pair of stops 74 and 76, respectively, and which are located in final assembly to project radially inwardly in alternating arcuate sections 64. From a review of FIGS. 8 and 9, it will be appreciated that the edges 68 and 70 are interconnected only by springs 72 and that the area between the edges 68 and 70 is substantially void of material.

Referring to FIG. 8, the edge 68 includes a generally U-shaped edge portion 80 forming a slot 82 opening through the edge 68. Each slot 82 is located at the juncture between adjacent reversely curved sections, i.e., where the reversely curved sections intersect the plane A—A illustrated in FIG. 6. Similarly, in FIG. 9, the strip 62 has generally U-shaped edge portions 84 defining slots 86 which open through the opposite edge 70 of strip 62. Slots 86 are likewise located at the juncture of the arcuate sections 64B and 66B of strip 62 intersecting the plane B—B.

Figure 7:
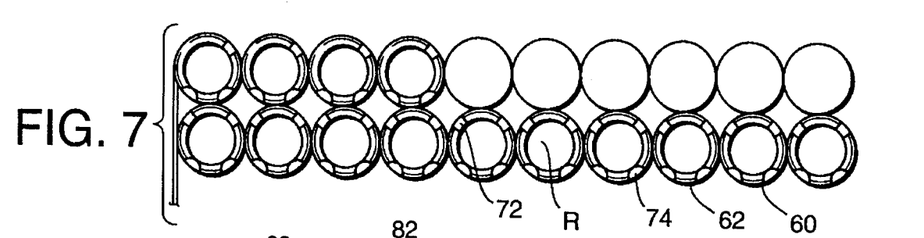
FIG. 7 is a partial plan view of a spacer using pairs of the strips illustrated in FIG. 6.

To assemble a spacer using the strips 60 and 62 of this embodiment, the strips are laterally juxtaposed and intermeshed so that the slots 82 of strip 60 receive the bases of edge portions 84 and edges 68 of strip 62, while simultaneously the slots 86 of strip 62 receive the bases of the edge portions 80 and edges 70 of strip 62. In intermeshing the strips 60 and 62, it will be appreciated that the pair of springs 72 of each strip lie directly opposite the inwardly projecting stops 74 of the other strip whereby the springs may bias the fuel rods R disposed within the circular openings against the stops. The strips are welded to one another at their junctures. As illustrated in FIG. 7, plural rows of the first and second strips can be disposed side-by-side within the peripheral frame or band of the spacer and welded to one another to form a rigid spacer structure. To facilitate the connection of each of the rows of cells formed by the pairs of strips, the upper and lower edges of the strips may be formed into longitudinally projecting tabs 88 (FIG. 10) received in slots 90 formed in upper and lower edges of a peripheral spacer band 90. Preferably, tabs 88 are welded to the band 90.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A spacer for retaining nuclear fuel rods in laterally spaced relation relative to one another comprising:

a generally rectilinear peripherally extending spacer band;

first and second sets of spacer strips extending in first and second generally mutually perpendicular diagonal directions, respectively, relative to said spacer band;

the strips of said first and second sets thereof each having linearly extending sections with adjacent sections angularly related to one another and meeting at apices;

said sections of each strip alternately intersecting a diagonal line across said spacer with the apices alternately located on opposite sides of the diagonal line;

alternate apices of each strip having springs projecting to one side thereof for engaging fuel rods and apices of each strip between said alternate apices having stops projecting to an opposite side of said strip for engaging fuel rods;

the sections of the first and second sets of strips having slots intermediate adjacent apices thereof and opening through opposite edges thereof, respectively;

first and second sets of strips being intermeshed with one another with the slots of the first set of strips receiving portions of the sections of the second set of strips and the slots of the second set of strips receiving portions of the sections of said first set of strips.

2. A spacer according to claim 1 wherein each said strip has walls in each said section defining said slot disposed at an angle other than an angle normal to said section.

3. A spacer according to claim 1 wherein said first and second strips, when intermeshed with one another, form pairs of acute and obtuse angles on opposite sides of the intersection of said strips.

4. A spacer according to claim 1 wherein said strips comprise linearly extending bands extending along opposite edges thereof and spaced from one another and intermediate bands interconnecting said bands along opposite edges of said strips to define voids within said section and spaced longitudinally therealong.

5. A spacer according to claim 4 wherein at least one of said intermediate bands lies between the apices of adjacent sections and contains one of said slots.

6. A spacer according to claim 5 wherein said slots extend transversely of said strips a distance substantially equal to one-half the width of each strip.

7. A spacer according to claim 4 wherein said spring is comprised of an intermediate band at an apex and projects to one side of said strip, terminating at a spring contact surface substantially medially of the length of said intermediate band.

8. A spacer according to claim 4 wherein each apex between said alternate apices has a pair of stops formed along said linearly extending bands.

9. A spacer for retaining nuclear fuel rods in laterally spaced relation relative to one another comprising:

a generally rectilinear peripherally extending spacer band;

first and second sets of spacer strips extending in first and second generally mutually perpendicular diagonal directions, respectively, relative to said spacer band;

the strips of said first and second sets thereof each having linearly extending sections with adjacent sections angularly related to one another and meeting at apices;

springs projecting to one side and forming part of each strip for engaging fuel rods and stops projecting to an opposite side of each strip for engaging fuel rods;

said sections of the first and second sets of strips having slots opening through opposite edges thereof, respectively;

first and second sets of strips being intermeshed with one another with the slots of the first set of strips receiving portions of the sections of the second set of strips and the slots of the second set of strips receiving portions of the sections of said first set of strips thereby defining a rectilinear array of discrete cells for receiving fuel rods with each cell bounded by a pair of strips of said first set thereof and a pair of strips of said second set thereof forming an octagonal cell having linear sides;

strips defining adjacent cells in said rectilinear array thereof intersecting one another between said adjacent cells forming substantially a line contact with one another.

10. A spacer according to claim 9 wherein each said strip has walls in each said section defining said slot disposed at an angle other than an angle normal to said section.

11. A spacer according to claim 9 wherein said first and second strips, when intermeshed with one another, form pairs of acute and obtuse angles on opposite sides of the intersection of said strips.

12. A spacer according to claim 9 wherein said strips comprise linearly extending bands extending along opposite edges thereof and spaced from one another and intermediate bands interconnecting said bands along opposite edges of said strips to define voids within said section and spaced longitudinally therealong.

13. A spacer according to claim 12 wherein at least one of said intermediate bands lies between the apices of adjacent sections and contains one of said slots.

14. A spacer according to claim 13 wherein said slots extend transversely of said strips a distance substantially equal to one-half the width of each strip.

15. A spacer according to claim 12 wherein said spring is comprised of an intermediate band at an apex and projects to one side of said strip, terminating at a spring contact surface substantially medially of the length of said intermediate band.

16. A spacer according to claim 9 wherein alternate apices of each strip have said springs projecting to one side thereof and apices between said alternate apices have said stops projecting to an opposite side thereof.

17. A spacer for retaining nuclear fuel rods in laterally spaced relation relative to one another, comprising:

a generally rectilinear peripherally extending spacer band;

a plurality of spacer strips within said spacer band for forming a plurality of openings for receiving fuel rods and spacing the fuel rods from one another;

first and second spacer strips of said plurality thereof each including alternate reversely curved arcuate sections with next-adjacent sections having a spring and a stop projecting in opposite directions, respectively, from the strip and being formed integrally with the strips;

each of the first and second strips having slots at junctures between said reversely curved sections and opening through opposite edges of said strips, the first and second strips being laterally juxtaposed and intermeshed with one another, with the slots of the first strip receiving portions of the second strip and the slots of the second strip receiving portions of the first strip such that the arcuate sections of the first and second strips lie laterally opposite one another and form generally circular openings with the springs of each of the first and second strips lying opposite stops of each other, respectively, of the first and second strips across said openings.

18. A spacer according to claim 17 wherein the next-adjacent arcuate sections of each of said first and second strips having respectively a pair of springs arcuately spaced from one another and a pair of stops arcuately spaced from one another such that each opening formed by the laterally juxtaposed and intermeshed first and second strips has a pair of springs and a pair of stops projecting generally radially inwardly of the opening.

19. A spacer according to claim 17 wherein the next-adjacent arcuate sections of each of said first and second strips have, respectively, a pair of springs arcuately spaced from one another and pairs of stops, with the stops of each pair thereof being arcuately spaced from one another along opposite edges of the strip, the springs having radially innermost projections substantially medially between opposite edges of the strip.

20. A spacer according to claim 17 wherein the next-adjacent arcuate sections of each of said first and second strips having respectively a pair of springs arcuately spaced from one another and a pair of stops arcuately spaced from one another such that each opening formed by the laterally juxtaposed and intermeshed first and second strips has a pair of springs and a pair of stops projecting generally radially inwardly of the opening, said strips having bands extending along opposite edges thereof and spaced from one another, said spring extending between said bands and constituting the sole interconnection between the bands along opposite edges of the strip.

21. A spacer according to claim 17 including a peripheral frame about the spacer, each of the strips having end tabs, said peripheral frame having slots for receiving the end tabs to secure the strips to the frame of the spacer.

* * * * *